No. 789,172. PATENTED MAY 9, 1905.
E. ROECK.
CAKE MIXER.
APPLICATION FILED JAN. 9, 1905.

Witnesses
M. C. Lyddane
Howard W. Orr

Inventor
Emmanuel Roeck
By E. G. Siggers
H. W. Riley
Attorneys

No. 789,172. Patented May 9, 1905.

UNITED STATES PATENT OFFICE.

EMMANUEL ROECK, OF MADISON, WISCONSIN.

CAKE-MIXER.

SPECIFICATION forming part of Letters Patent No. 789,172, dated May 9, 1905.

Application filed January 9, 1905. Serial No. 240,300.

*To all whom it may concern:*

Be it known that I, EMMANUEL ROECK, a citizen of the United States, residing at Madison, in the county of Dane and State of Wisconsin, have invented new and useful Improvements in Cake-Mixers, of which the following is a specification.

The invention relates to improvements in cake-mixers.

The object of the present invention is to improve the construction of cake-mixers, and to provide a simple, inexpensive, and efficient device adapted to be readily placed in and removed from a pan or analogous receptacle and capable of being easily operated for mixing the ingredients and for working the cake-dough to the desired extent.

A further object of the invention is to provide a detachable device of this character adapted to be readily centered on and rotated within a receptacle and capable after the mixing operation has been completed of being readily cleaned.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
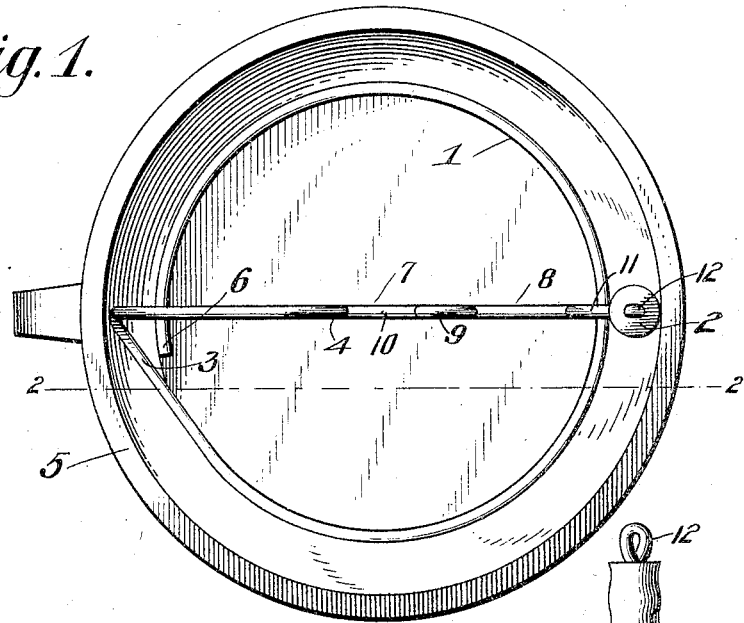
Figure 2:
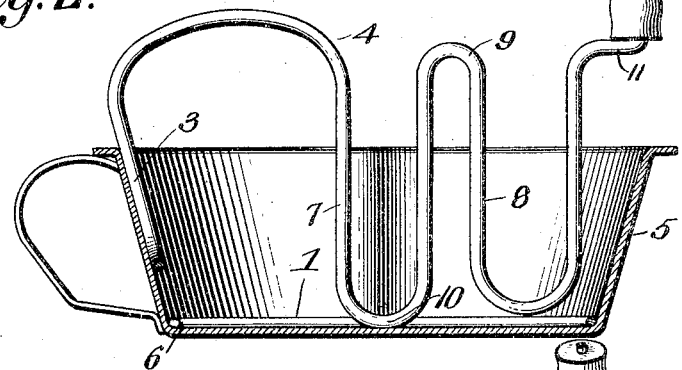
Figure 3:
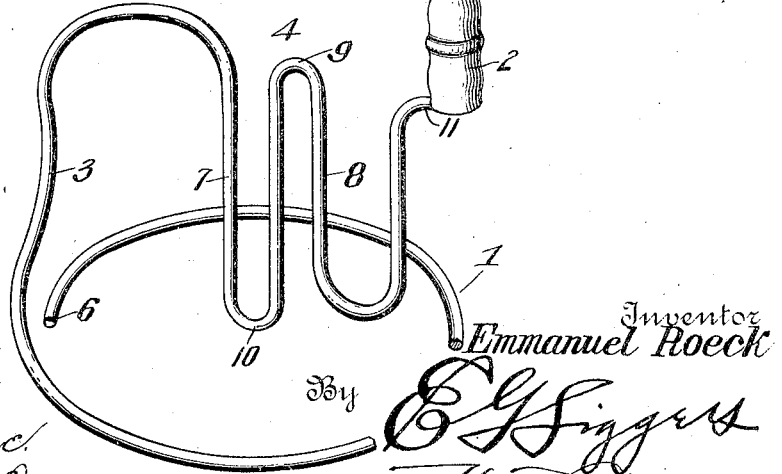

In the drawings, Figure 1 is a plan view of a cake-mixer constructed in accordance with this invention and shown applied to a pan. Fig. 2 is a vertical sectional view on the line 2 2 of Fig. 1. Fig. 3 is a detail perspective view of the cake-mixer.

Like numerals of reference designate corresponding parts in all the figures of the drawings.

1 designates the base of the cake-mixer, which, with the exception of the handle 2, is constructed of a single piece of stout wire and which consists of the said base, an inclined scraper-arm 3, and a transverse agitator 4. The base, which is circular, consists of an open horizontal loop adapted to fit snugly within and engage the walls of a pan 5. The base, which consists of a horizontal bottom ring and is arranged on the bottom of the pan, is resilient and is adapted to be readily adjusted or shaped to fit the pan or other receptacle properly. One end 6 of the circular base is free and its other end is extended to form the inclined scraper-arm, which may be of any desired length and which extends upward from the bottom of the pan to a point above the top thereof.

The inclined arm 3 is adapted to scrape the material from the walls of the pan and may be moved either to the right or to the left for this purpose. The upper end of the inclined mixing-arm is connected with the agitator, which is located at the opposite side of the device, and which consists of inner and outer substantially U-shaped loops 7 and 8, connected at their adjacent sides by a top portion 9 and forming a plurality of upwardly-extending agitator portions, which are adapted to engage and stir or work the material. The inner loop projects slightly below the outer loop and its bottom portion 10 is rounded and located at the center of the bottom of the pan and is adapted to form a pivot on which the device rotates. The outer side of the loop is provided with a substantially L-shaped extension 11, having an upwardly-extending portion upon which the handle 2 is mounted. The upwardly-extending portion is bent to form a stop 12 for retaining the handle on the extension. The handle, which may be of any desired form, is preferably constructed of wood, and it greatly facilitates the operation of the device. After the mixing operation has been completed the material adhering to the device may be readily removed therefrom by sliding the fingers along the wire from the handle to the free end 6 of the base.

It will be seen that the device is exceedingly simple and inexpensive in construction, that it is adapted to be readily applied to an ordinary pan without altering the construction thereof, and that it may be readily removed from the pan after the mixing operation has been completed. It will also be seen that the device rotates freely on the pivotal loop of the agitator and that it is centered and supported by the circular base. The inclined scraper-arm is also adapted to work the material either up or down, and the pan can be easily tilted to throw the mass to one side or the other of the center for facilitating rapid mixing or working.

Having thus fully described my invention, what I claim as new, and desire to secure by Letters Patent, is—

1. A mixing device of the class described, provided with an open bottom ring for removably supporting it upon the bottom of a receptacle and for enabling it to be rotated thereon.

2. A mixing device of the class described, provided with means for removably supporting it upon the bottom of a receptacle and for enabling it to be rotated thereon, said means embodying a rotary horizontal base arranged to rest upon the bottom and fit against the opposite walls of the receptacle for centering the device.

3. A mixing device of the class described provided with means for removably supporting it upon the bottom of a receptacle and for enabling it to be rotated thereon, said means embodying an open horizontal bottom ring adapted to rest upon the bottom of the receptacle and arranged to fit against the walls thereof.

4. A mixing device of the class described provided with means for removably supporting it upon the bottom of a receptacle and for enabling it to be rotated thereon, said means embodying a central pivot arranged to be supported by the bottom of the receptacle, and a horizontal bottom ring arranged to center the pivot.

5. A mixing device of the class described, comprising an open horizontal rotary base adapted to be removably arranged on the bottom of a receptacle, and an agitator connected with the base and provided with a pivotal portion arranged to rest upon the bottom of the receptacle at the center thereof.

6. A mixing device of the class described, comprising a horizontal base adapted to be removably arranged upon the bottom of a receptacle and being of a size to fit against the opposite walls thereof, an agitator, and an arm connected with the agitator and with the base and arranged to scrape the walls of the receptacle.

7. A mixing device of the class described, comprising a base adapted to be removably arranged upon the bottom of a receptacle, an agitator having a pivotal portion and extending therefrom to one side of the device, and a scraper connected with the base and with the agitator and located at the opposite side of the base.

8. A mixing device of the class described, comprising a horizontal bottom ring arranged to rest upon the bottom of the receptacle, an inclined scraper-arm extending upward from the said ring and arranged to scrape the walls of the receptacle, and an agitator connected with the scraper-arm.

9. A mixing device of the class described, comprising a base arranged to rest upon the bottom of the receptacle, an inclined scraper-arm extending upward from the base and arranged to scrape the walls of the receptacle, and an agitator connected with the scraper-arm and located at the opposite side of the device and having a pivotal portion.

10. A mixing device of the class described, comprising a base adapted to rest upon the bottom of the pan, and an agitator connected with the base and consisting of a plurality of upright bends, one of the bends being located at the center of the device and extended to form a pivotal portion.

11. A mixing device of the class described, constructed of a single piece of wire, and consisting of a substantially circular base, a scraper-arm extending upward from the base, and an agitator consisting of a plurality of upright bends, one of the bends forming a pivotal portion and located at the center of the device.

12. A mixing device of the class described, constructed of wire, and comprising an open base, an upwardly-extending scraper-arm arranged at one side of the device, an agitator extending from the center of the device to the opposite side and having a pivotal portion, and a handle-arm extending upward from the outer portion of the agitator.

In testimony whereof I affix my signature in presence of two subscribing witnesses.

EMMANUEL ROECK.

Witnesses:
 PAUL KARBERG,
 NICHOLAS A. MEYER.